(12) United States Patent
Zhao

(10) Patent No.: US 11,670,200 B2
(45) Date of Patent: Jun. 6, 2023

(54) ORIENTATED DISPLAY METHOD AND APPARATUS FOR AUDIO DEVICE, AND AUDIO DEVICE

(71) Applicant: GOERTEK INC., Shandong (CN)

(72) Inventor: Jifu Zhao, Shandong (CN)

(73) Assignee: GOERTEK INC., Shandong (CN)

( * ) Notice: Subject to any disclaimer, the term of this patent is extended or adjusted under 35 U.S.C. 154(b) by 124 days.

(21) Appl. No.: 17/309,137

(22) PCT Filed: Dec. 29, 2018

(86) PCT No.: PCT/CN2018/125256
§ 371 (c)(1),
(2) Date: Apr. 29, 2021

(87) PCT Pub. No.: WO2020/087748
PCT Pub. Date: May 7, 2020

(65) Prior Publication Data
US 2022/0013047 A1    Jan. 13, 2022

(30) Foreign Application Priority Data
Oct. 29, 2018 (CN) .......................... 201811270177.8

(51) Int. Cl.
*G09G 3/00* (2006.01)
*G06T 7/70* (2017.01)
*H04N 23/698* (2023.01)

(52) U.S. Cl.
CPC .............. *G09G 3/002* (2013.01); *G06T 7/70* (2017.01); *H04N 23/698* (2023.01);
(Continued)

(58) Field of Classification Search
CPC ....... G09G 2320/0261; G09G 2320/08; G09G 2354/00; G09G 3/001; G09G 3/002; G06T 2207/20212; G06T 2207/20221; G06T 7/70; H04N 5/23219; H04N 5/23238; H04N 5/23293; H04N 23/698; H04N 23/611; H04N 23/63; H04N 23/61; G06F 3/0481; H04R 1/20
See application file for complete search history.

(56) References Cited

U.S. PATENT DOCUMENTS

2018/0032997 A1* 2/2018 Gordon .............. G06Q 30/0269

FOREIGN PATENT DOCUMENTS

| CN | 102033549 A | 4/2011 |
| CN | 106155200 A | 11/2016 |

(Continued)

*Primary Examiner* — Farzana Hossain
(74) *Attorney, Agent, or Firm* — LKGlobal | Lorenz & Kopf, LLP

(57) ABSTRACT

A directional display method and device of audio equipment, and audio equipment are disclosed. The audio equipment comprises a camera module and a display screen that is circumferentially located on sides of the audio equipment. The method comprises: activating the camera module for panoramic shooting to detect a user position in response to an activation signal acquired; when multiple users are detected, determining a display area of the display screen according to a positional relationship between the multiple users and a center position of the horizontal projection of the display screen; and controlling the display area to display.

10 Claims, 7 Drawing Sheets

(52) U.S. Cl.
CPC ............ *G06T 2207/20212* (2013.01); *G06T 2207/20221* (2013.01); *G09G 2320/08* (2013.01); *G09G 2354/00* (2013.01)

(56) References Cited

FOREIGN PATENT DOCUMENTS

| | | |
|---|---|---|
| CN | 107423021 A | 12/2017 |
| CN | 107643886 A | 1/2018 |
| CN | 206894784 U | 1/2018 |
| CN | 108563410 A | 9/2018 |
| CN | 108614583 A | 10/2018 |
| EP | 0669782 A2 | 8/1995 |
| JP | H0432376 A | 2/1992 |
| WO | 2015042897 A1 | 4/2015 |

\* cited by examiner

ORIENTATED DISPLAY METHOD AND APPARATUS FOR AUDIO DEVICE, AND AUDIO DEVICE

CROSS-REFERENCE TO RELATED APPLICATIONS

This application is a U.S. National-Stage entry under 35 U.S.C. § 371 based on International Application No. PCT/CN2018/125256, filed Dec. 29, 2018 which was published under PCT Article 21(2) and which claims priority to Chinese application No. 201811270177.8, filed Oct. 29, 2018, which are all hereby incorporated herein in their entirety by reference.

TECHNICAL FIELD

This Application pertains to a directional display method and device of audio equipment, and audio equipment.

BACKGROUND

With the improvement of living standards, more and more smart-home devices have entered our daily lives. As one kind of them, smart speakers are immensely popular. Some smart multimedia equipments on the market are mostly provided with a display screen. The display screen may be used not only to display relevant information, but also to achieve human-computer interaction control of the smart speaker with touch screen.

Currently, the display direction of the display screen of smart speakers is generally fixed, and cannot be adjusted in real time to track the user in real time for directional display, so that the user must move to face the display or manually move the speaker when viewing the display screen or performing touch operations, results in poor human-computer interaction and affects user experience. In addition, other objects, desirable features and characteristics will become apparent from the subsequent summary and detailed description, and the appended claims, taken in conjunction with the accompanying drawings and this background.

SUMMARY

The present disclosure provides a directional display method and device of audio equipment, and audio equipment, to solve the problem in the prior art that the display screen cannot accurately face the user and results in poor human-computer interaction.

One aspect of the present disclosure provides a directional display method of audio equipment, wherein the audio equipment comprises a camera module and a display screen that is circumferentially located on sides of the audio equipment, and the method of the present disclosure comprises: activating the camera module for panoramic shooting to detect a user position, in response to an activation signal acquired; when multiple users are detected, determining a display area of the display screen according to a positional relationship between the multiple users and a horizontal projection center position of the display screen; and controlling the display area to display.

Preferably, the camera module includes at least one panoramic camera, or at least one set of binocular cameras, or a spherical camera array having multiple cameras.

Preferably, the horizontal projection center position of the display screen includes a center position of a projection circle formed by projecting the display screen on a first plane.

Preferably, activating the camera module for panoramic shooting to detect a user position comprises: continuously taking pictures using the camera module to obtain panoramic images; determining an target in the panoramic images as a detected user according to position changes of the target relative to an background in the panoramic images at different moments; and determining a projection angle of the user relative to the projection circle according to the user position in a panoramic image and a proportional relationship between a length of the panoramic image and a perimeter of the projection circle.

Preferably, activating the camera module for perform panoramic shooting to detect a user position comprises: continuously taking pictures using a camera module to obtain panoramic images; determining a user existing in the panoramic images according to position changes of the user relative to an background in the panoramic images at different moments; and determining a projection angle of the user relative to the projection circle according to the user position in the panoramic image and a proportional relationship between a length of the panoramic image and a perimeter of the projection circle.

Preferably, determining the display area according to a quantity of groups in which the multiple users are located and a positional relationship among the groups in which the multiple users are located comprises: if the multiple groups in which the multiple users are located are not adjacent to each other in location, determining the display area as full screen display; if the multiple groups are located adjacent to each other in location, determining the display area according to the horizontal projection center position of the display screen and the projection angle of the user relative to the projection circle.

Preferably, if the multiple groups are located adjacent to each other in location, determining the display area according to the horizontal projection center position of the display screen and the projection angle of the user relative to the projection circle comprises: sorting the multiple groups in which the multiple users are located according to a grouping direction which is an ascending order by corresponding arc angles of the groups, wherein the multiple groups in which the multiple users are located include a first group and a second group; when the second group is adjacent to the first group in location with respect to the grouping direction, acquiring a first included angle formed on the horizontal plane by a first connection line between the user position with a smallest projection angle in the first group and the horizontal projection center position of the display screen and a second connection line between the user position with a largest projection angle in the second group and the horizontal projection center position of the display screen, and determining an arc-shaped area enclosed by arcs on upper and lower edges of the display screen corresponding to the first included angle as the display area; when the second group is adjacent to the first group in location with respect to an direction opposite to the grouping direction, acquiring a second included angle formed on the horizontal plane by a third connection line between the user position with a largest projection angle in the first group and the horizontal projection center position of the display screen and a fourth connection line between the user position with a smallest projection angle in the second group and the horizontal projection center position of the display screen, and determining an arc-shaped area enclosed by arcs on upper and lower edges of the display screen corresponding to the second included angle as the display area.

Preferably, when the multiple users include a first user, a second user, and a third user, determining the display area according to a quantity of groups in which the multiple users are located and a positional relationship among the groups in which the multiple users are located comprises: when the first user, the second user, and the third user are respectively in three groups, or when the first user, the second user, and the third user are in two groups but the two groups in which the three users are located are not adjacent to each other in location, determining the display area as full screen display; when the first user and the second user are in a first group, and the third user is in a second group, if the second group is adjacent to the first group in location with respect to the grouping direction, acquiring an included angle formed on the horizontal plane by the first connection line between the user position on the projection circle corresponding to the first user and the horizontal projection center position of the display screen and the second connection line between the user position on the projection circle corresponding to the third user and the horizontal projection center position of the display screen as the first included angle, and determining an arc-shaped area enclosed by arcs on upper and lower edges of the display screen corresponding to the first included angle as the display area; if the second group is adjacent to the first group in location with respect to an direction opposite to the grouping direction, acquiring an included angle formed on the horizontal plane by the third connection line between the user position on the projection circle corresponding to the second user and the horizontal projection center position of the display screen and a fourth connection line between the user position on the projection circle corresponding to the third user and the horizontal projection center position of the display screen as the second included angle, and determining an arc-shaped area enclosed by arcs on upper and lower edges of the display screen corresponding to the second included angle as the display area; wherein an angle on the projection circle corresponding to the first user is smaller than an angle on the projection circle corresponding to the second user.

Preferably, determining the display area according to a quantity of groups in which the multiple users are located and a positional relationship among the groups in which the multiple users are located comprises: when the multiple users are in a same group, acquiring a third included angle formed on the horizontal plane by a fifth connection line between the user position corresponding to a smallest projection angle and the horizontal projection center position of the display screen and a sixth connection line between the user position corresponding to a largest projection angle and the horizontal projection center position of the display screen; and determining an arc-shaped area enclosed by arcs on upper and lower edges of the display screen corresponding to the third included angle as the display area.

Preferably, when the multiple users include a first user and a second user, determining the display area according to a quantity of groups in which the multiple users are located and a positional relationship among the groups in which the multiple users are located comprises: when the first user and the second user are in a same group, acquiring an included angle formed on the horizontal plane by the seventh connection line between the user position on the projection circle corresponding to the first user and the horizontal projection center position of the display screen and the eighth connection line between a user position on the projection circle corresponding to the second user and the horizontal projection center position of the display screen as the fourth angle; and determining an arc-shaped area enclosed by arcs on upper and lower edges of the display screen corresponding to the fourth included angle as the display area.

The directional display method according to the present disclosure detects the user position using the camera module, and when multiple users are detected, determines the display area according to the positional relationship between the multiple users and the horizontal projection center position of the display screen, and controls this part of display area for displaying, to ensure that multiple users are all within the display area of the audio equipment and thus improving visual experience of the audio equipment in the case of multi-person interaction.

Another aspect of the present disclosure provides a directional display method of audio equipment, wherein the audio equipment comprises a camera module and a display screen that is circumferentially located on sides of the audio equipment, and the method of the present disclosure comprises: activating the camera module for panoramic shooting to detect a user position in response to an activation signal acquired, wherein the user position includes a user direction indicated by a connection line between a user angular position relative to the projection circle and a horizontal projection center position of the display screen; when a single user is detected, taking the user direction as an angle bisector of a preset mapping angle, and determining arcs on upper and lower edges of the display screen corresponding to the mapping angle; and determining a display area of the display screen using an arc-shaped area enclosed by the arcs, and controlling the display area to display; wherein the horizontal projection center position of the display screen includes a center position of a projection circle formed by projecting the display screen on a first plane.

The directional display method according to the present disclosure detects the user position using the camera module, and when a single user is detected, the display area is determined for directional display according to the user direction and the preset mapping angle, so that the audio equipment may follow the change of the user position and adjust the visual display area in real time, thereby improving human-computer interaction effect and enhancing user experience.

Another aspect of the present disclosure provides a directional display device of audio equipment, wherein the audio equipment comprises a camera module and a display screen that is circumferentially located on sides of the audio equipment, and the device of the present disclosure comprises: a first detecting unit for activating the camera module for panoramic shooting to detect a user position in response to an activation signal acquired; a first calculating unit for, when multiple users are detected, determining a display area of the display screen according to a positional relationship between the multiple users and a horizontal projection center position of the display screen; and a first controlling unit for controlling the display area to display.

In the directional display device according to the present disclosure, the first detecting unit detects the user position using a camera module, when multiple users are detected, the first calculating unit determines the display area according to the positional relationship between the multiple users and the horizontal projection center position of the display screen, and the first controlling unit controls this part of display area to display, to ensure that multiple users are all within the display area of the audio equipment and thus improving visual experience of the audio equipment in the case of multi-person interaction.

Another aspect of the present disclosure provides a directional display device of audio equipment, wherein the audio equipment comprises a camera module and a display screen that is circumferentially located on sides of the audio equipment, and device of the present disclosure comprises: a second detecting unit for activating the camera module for panoramic shooting to detect a user position in response to an activation signal acquired, wherein the user position includes a user direction indicated by a connection line between a user's angular position relative to the projection circle and a horizontal projection center position of the display screen; a second calculating unit for, when a single user is detected, taking the user direction as an angle bisector of a preset mapping angle, and determining arcs on upper and lower edges of the display screen corresponding to the mapping angle; and a second controlling unit for determining a display area of the display screen using an arc-shaped area enclosed by the arcs, and controlling the display area to display; wherein the horizontal projection center position of the display screen includes a center position of a projection circle formed by projecting the display screen on a first plane.

In the directional display device according to the present disclosure, the second detecting unit detects the user position using a camera module, when a single user is detected, the second calculating unit determines the display area according to the user direction and the preset mapping angle; and the second controlling unit controls this part of display area to display, so that the audio equipment may follow the change of the user position and adjust the visual display area in real time, thereby improving human-computer interaction effect and enhancing user experience.

Another aspect of the present disclosure provides audio equipment comprising a camera module and a display screen that is circumferentially located on sides of the audio equipment, wherein the audio equipment further comprises a processor and a machine-readable storage medium having machine-executable instructions stored thereon, and when reading and executing the machine-executable instructions in the machine-readable storage medium, the processor can execute the above directional display method of audio equipment.

Another aspect of the present disclosure provides a machine-readable storage medium having machine-executable instructions stored thereon, and when executed by a processor, the machine-executable instructions can realize the above directional display method of audio equipment.

BRIEF DESCRIPTION OF DRAWINGS

The present invention will hereinafter be described in conjunction with the following drawing figures, wherein like numerals denote like elements, and.

DETAILED DESCRIPTION

Figure 1:
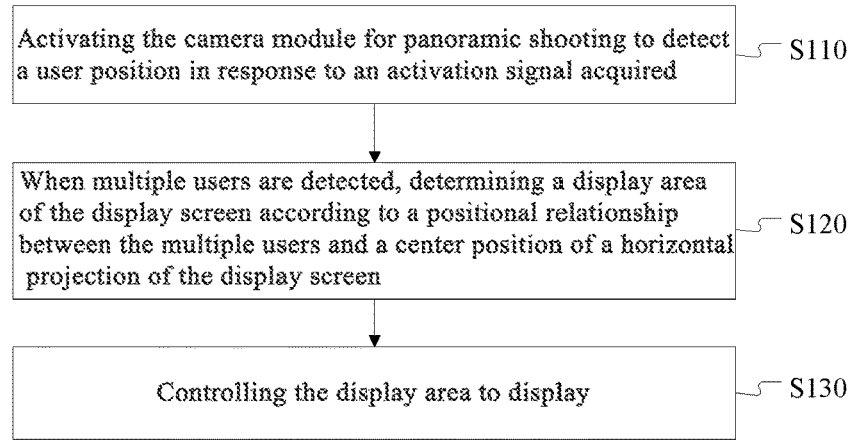
FIG. 1 is a flowchart of a directional display method of audio equipment according to an embodiment of the present disclosure.

The following detailed description is merely exemplary in nature and is not intended to limit the invention or the application and uses of the invention. Furthermore, there is no intention to be bound by any theory presented in the preceding background of the invention or the following detailed description.

In order to clarify the objectives, technical solutions, and advantages of the present disclosure, the embodiments of the present disclosure will be described in further detail below in conjunction with the accompanying drawings.

The embodiments of the present disclosure will be described below with reference to the drawings. However, it should be understood that these descriptions are only exemplary, and are not intended to limit the scope of the present disclosure. In addition, in the following description, descriptions about well-known structures and techniques are omitted to avoid unnecessarily obscuring the concept of the present disclosure.

The terminology used herein is only for describing specific embodiments, and is not intended to limit the present disclosure. As used herein, the singular forms "a", "an", and "the" are intended to include the plural forms as well, unless the context clearly indicates otherwise. In addition, as used herein, the terms "comprises", "comprising", "includes" and "including" specify the presence of stated features, steps, operations, and/or components, but do not preclude the presence or addition of one or more other features, steps, operations, or components.

All terms (including technical and scientific terms) used herein have the meanings commonly understood by those skilled in the art, unless otherwise defined. It should be noted that the terms used herein should be interpreted as having meanings consistent with the context of this specification, and should not be interpreted in an idealized or overly rigid manner.

Some block diagrams and/or flowcharts are shown in the drawings. It should be understood that some blocks or combinations of blocks in the block diagrams and/or flowcharts can be implemented by computer program instructions. These computer program instructions can be provided to the processor of a general-purpose computer, a special-purpose computer, or other programmable data processing device, so that these instructions, when executed by the processor, can create a device for implementing the functions/operations specified in these block diagrams and/or flowcharts.

Therefore, the technology of the present disclosure can be implemented in the form of hardware and/or software (including firmware, microcode, etc.). In addition, the technology of the present disclosure may be in the form of a computer program product on a computer-readable medium having instructions stored thereon, and the computer program product can be used by an instruction execution system or in combination with an instruction execution system. In the context of the present disclosure, a computer-readable medium may be any medium that can contain, store, transmit, propagate, or transmit instructions. For example, the computer-readable medium may include, but is not limited to, an electric, magnetic, optical, electromagnetic, infrared, or semiconductor system, device, device, or propagation medium. Specific examples of the computer-readable medium include: a magnetic storage device, such as a magnetic tape or hard disk (HDD); an optical storage device, such as an optical disk (CD-ROM); a memory, such as a random access memory (RAM) or a flash memory; and/or a wired/wireless communication link.

One aspect of the present disclosure provides a directional display method of audio equipment suitable for a multi-person interaction situation.

In the present embodiment, the audio equipment comprises a camera module and a display screen that is circumferentially located on sides of the audio equipment. The projection of the display screen on the horizontal plane corresponds to a circle.

FIG. 1 is a flowchart of a directional display method of audio equipment according to an embodiment of the present disclosure. As shown in FIG. 1, the method in the present embodiment comprises:

S110: activating the camera module for panoramic shooting to detect a user position in response to an activation signal acquired;

S120: when multiple users are detected, determining a display area of the display screen according to a positional relationship between the multiple users and a horizontal projection center position of the display screen;

Wherein, the horizontal projection center position of the display screen includes a center position of a projection circle formed by projecting the display screen on a first plane. It may be understood that the projection of the display screen on the first plane forms the circumference of the projection circle, and the center position of the horizontal projection of the display screen is located at the center position of the circumference.

S130: controlling the display area to display.

The present embodiment detects the user position using the camera module, and when multiple users are detected, determines the display area according to the positional relationship between the multiple users and the center position of the horizontal projection of the display screen, and controls this part of display area to display, to ensure that multiple users are all within the display area of the audio equipment and thus improving visual experience of the audio equipment in the case of multi-person interaction.

The above steps S110-S130 will be described in detail below in conjunction with FIG. 2 to FIG. 15.

First, step S110 is executed. Namely, in response to an activation signal acquired, the camera module is activated for panoramic shooting to detect the user position.

In an embodiment, the activation signal includes an electrical signal generated from a voice signal carrying a preset keyword. The voice signal can be picked up by a microphone array in the audio equipment and converted into an electrical signal. When the voice signal carries a preset keyword, the detector array is activated according to the preset keyword carried. For example, the preset keyword includes "Xiaozhi (literally, Smart Guy)", the received voice signal is "hello, Xiaozhi", and the preset keyword "Xiaozhi" carried by the voice signal can be obtained through voice recognition. At this point, the camera module of the audio equipment may be activated for panoramic shooting to detect the user position according to the electrical signal generated from the voice signal. The camera module includes at least one panoramic camera, or at least one set of binocular cameras, or a spherical camera array having multiple cameras, to be able to implement panoramic shooting, acquire panoramic images, and detect the user position based on the analysis of the panoramic images.

In the present embodiment, the activation signal acquired may be a periodic signal. According to the periodic characteristics of the activation signal, the camera module is periodically activated for panoramic shooting to detect the user position. For example, after activated the camera module for panoramic shooting for the first time, the camera module is turned off, the user position is detected with the panoramic images captured, and the relationship between the user position and the horizontal projection center position of the audio equipment is acquired. After determined a display area of the display screen according to the positional relationship between the user position and the horizontal projection center position of the display screen for displaying, at the node of the next period, the camera module is reactivated for panoramic shooting, the changes of users are analyzed based on the panoramic images, and a display area of the display screen is determined based on the changes of users and the relationship between the user position and the horizontal projection center position of the audio equipment for displaying. When the period of the activation signal is set, the power consumed by the camera module and the accuracy of the display screen for locating and tracking the user position must be considered. For example, the period may be set to 5-20 minutes.

In the present embodiment, the user position is detected in the following way: first, continuously taking pictures using the camera module to obtain panoramic images; then, determining an target in the panoramic images as a detected user according to position changes of the target relative to an background in the panoramic images at different moments; and then, determining a projection angle of the user relative to the projection circle according to the user position in the panoramic image and a proportional relationship between a length of the panoramic image and a perimeter of the projection circle.

Figure 4:
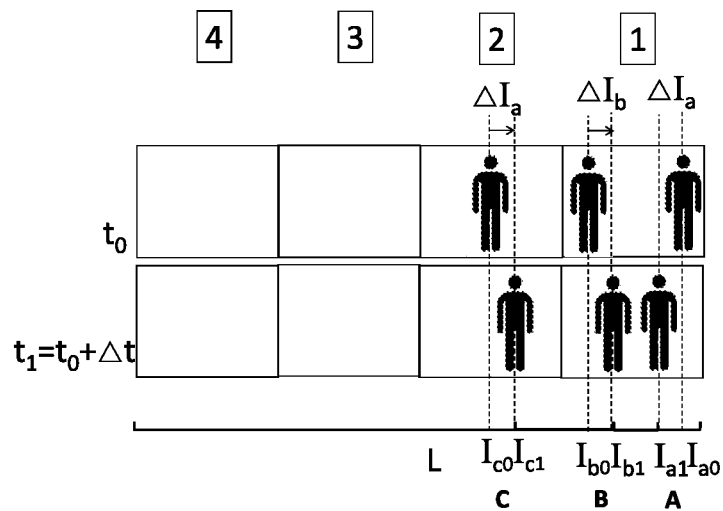
FIG. 4 is a schematic diagram of panoramic images at different moments according to an embodiment of the present disclosure.

As shown in FIG. 4, the camera module continuously takes pictures, and the photos taken at different moments are compared to analyze whether there are users around the audio equipment and the number of users there. The user will not remain absolutely still at any moment, and a high-definition camera module can perfectly capture the user's movement. For example, in FIG. 4, the targets A, B, C and the audio equipment are located in a space at the same time. After the camera module finished picture taking, two panoramic images at moment t0 and moment t1 are acquired. It can be determined whether the target is a user by comparing the position changes of the same target in the two panoramic images. Take target A as an example, at moment t0, target A is at position Ia0, and at moment t1, target A is at position Ia1. It can be determined that there is a position difference $\Delta Ia$ between the positions of target A at moment t0 and moment t1, which indicates that at this point and in the same background, target A has moved, and target A is a user. Similarly, at moment t0 and moment t1, targets B and C have position differences $\Delta Ib$ and $\Delta Ic$ relative to the background of the panoramic image, and targets B and C are both detected users.

After analyzing the panoramic images at different moments to determine that there is a user in the panoramic image, the projection angle of user relative to the projection circle can be determined according to a proportional relationship between a length of the panoramic image and a perimeter of the projection circle. Referring to FIG. 4, the projection circle formed by projecting the display screen on the first plane is a line segment with a certain length after expanded, and in FIG. 4 the length of the line segment and the length of the panoramic image are both L. Taking one end of the line segment as the base point, and assuming that the base point of the line segment corresponds to the right end of the panoramic image, determining the distances between users A to C in the panoramic image and the right end of the panoramic image at moment t1 as Ia1, Ib1, Ic1, respectively, then according to the following formula, it can be determined that the projection angle of user A relative to the projection circle is angle $\alpha$, the projection angle of user B relative to the projection circle is angle $\beta$, and the projection angle of user C relative to the projection circle is angle $\gamma$.

$$\alpha = 2\pi \frac{\Delta I_{a1}}{L}, \beta = 2\pi \frac{\Delta I_{b1}}{L}, \gamma = 2\pi \frac{\Delta I_{c1}}{L}$$

After detected the user position, continue to perform step S120. Namely, when multiple users are detected, a display area of the display screen is determined according to a positional relationship between the multiple users and a center position of the horizontal projection of the display screen.

In order to facilitate the calculation of the display area of the display screen, reduce the amount of calculation, and simplify the calculation steps, in the present embodiment, it is preset that the center position of the horizontal projection of the display screen includes the center position of the projection circle formed by projecting the display screen on a first plane.

In the present embodiment, the display area of the display screen is determined by the following method: first, grouping the multiple users according to an angle of the user relative to the center position of the horizontal projection of the display screen, wherein for each group, an arc length range of angle is set corresponds to the projection circle; then, determining the display area according to a quantity of groups in which the multiple users are located and a positional relationship among the groups in which the multiple users are located. Specifically, if the multiple groups in which the multiple users are located are not adjacent to each other in location, determining the display area as full screen display; if the multiple groups adjacent to each other in location, determining the display area according to the angle of the user relative to the projection circle and the center position of the horizontal projection of the display screen. Namely, sorting the multiple groups in which the multiple users are located according to a grouping direction which the arc lengths angles corresponding to the groups is an ascending order, wherein the multiple groups in which the multiple users are located include a first group and a second group; when the second group is adjacent to the first group in location with respect to the grouping direction, acquiring a first included angle formed on the horizontal plane by a first connection line between a user position with a smallest projection angle in the first group and the center position of the horizontal projection of the display screen and a second connection line between a user position with a largest projection angle in the second group and the center position of the horizontal projection of the display screen, and at this point, determining an arc-shaped area enclosed by arcs on upper and lower edges of the display screen corresponding to the first included angle as the display area; when the second group is adjacent to the first group in location with respect to an direction opposite to the grouping direction, acquiring a second included angle formed on the horizontal plane by a third connection line between a user position with a largest projection angle in the first group and the center position of the horizontal projection of the display screen and a fourth connection line between a user position with a smallest projection angle in the second group and the center position of the horizontal projection of the display screen, and at this point, determining an arc-shaped area enclosed by arcs on upper and lower edges of the display screen corresponding to the second included angle as the display area.

Figure 2:
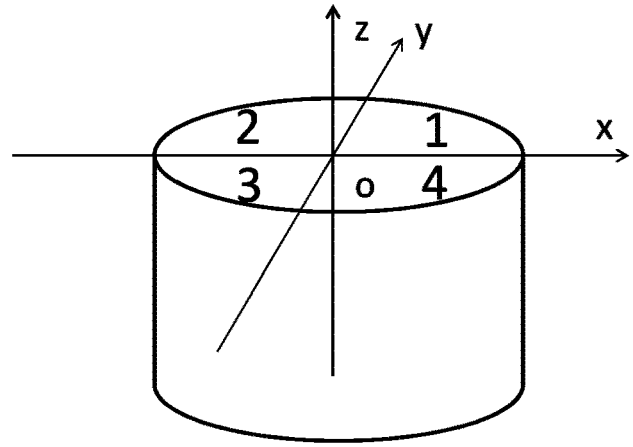
FIG. 2 is a schematic diagram of a spatial coordinate system established according to a horizontal projection center position of a display screen according to an embodiment of the present disclosure.

For ease of description, as shown in FIG. 2, a spatial rectangular coordinate system is established, in which the center position of the horizontal projection of the display screen is the coordinate origin O, the space vertical central line of the audio equipment is the Z axis, and two perpendicular lines in the first plane are the X axis and Y axis, respectively. Since the perimeter of the projection circle formed by projecting the display screen on the first plane is a determinate value, the projection angle of any point on the circumference of the projection circle relative to the center position of the horizontal projection of the display screen (i.e., the coordinate origin O) is determinate. Therefore, the projection angle of the user relative to the projection circle (i.e., the projection angle of the user relative to the center position of the horizontal projection of the display screen)

can be determined based on the proportional relationship between the perimeter of the projection circle and the length of the panoramic image and the positional relationship among the positions of the users in the panoramic image. Referring to FIG. 2, in the present embodiment, the numbers 1, 2, 3, 4 in FIG. 2 is used to represent the four quadrants of the XOY plane, namely, the number 1 is used to represent the first quadrant, the number 2 is used to represent the second quadrant, the number 3 is used to represent the third quadrant, and the number 4 is used to represent the fourth quadrant.

The present embodiment assumes that the arc length range of the projection circle corresponding to each group is 90°. In other words, the present embodiment assumes that there are four groups which are grouped according to a grouping direction which is an ascending order by corresponding angles of the arc lengths of the groups (i.e., In the present embodiment, the grouping direction is set to be clockwise). Obviously, the grouping direction may also be set in other ways, which is not specifically limited. The arc length range 0~90° of the projection circle corresponds to a grouping range, the arc length range 90°~180° of the projection circle corresponds to a grouping range, the arc length range 180°~270° of the projection circle corresponds to a grouping range, and the arc length range 270°~360° of the projection circle corresponds to a grouping range. As shown in FIG. 2, the four groups respectively correspond to the first quadrant to the fourth quadrant on the XOY plane.

Based on the above grouping method, in an example of the present embodiment, when the multiple users include the first user, the second user, and the third user, the display area is determined by any one of the following three methods.

(1) Method 1

When the first user, the second user, and the third user are in three groups respectively, or when the first user, the second user, and the third user are in two groups but the two groups in which the three users are located are not adjacent to each other in location, the display area is determined as full screen display.

Referring to FIG. 4, assuming that after analyzed the panoramic images at moment t0 and moment t1, it is detected that there are three users A to C around the audio equipment, and it is determined that the projection angles of users A to C relative to the projection circle are $\alpha=\pi/4$, $\beta=\pi 3/4$, $\gamma=\pi 5/4$, respectively, then, it can be determined that the first user A, the second user B, and the third user C are in different groups. At this point, the display area is determined as full screen display.

Figure 7:
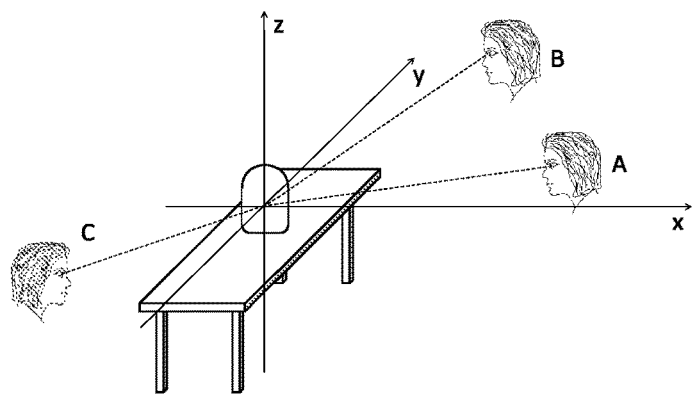
FIG. 7 is a schematic diagram showing that the groups in which three users are located are not adjacent to each other according to an embodiment of the present disclosure.
Figure 8:
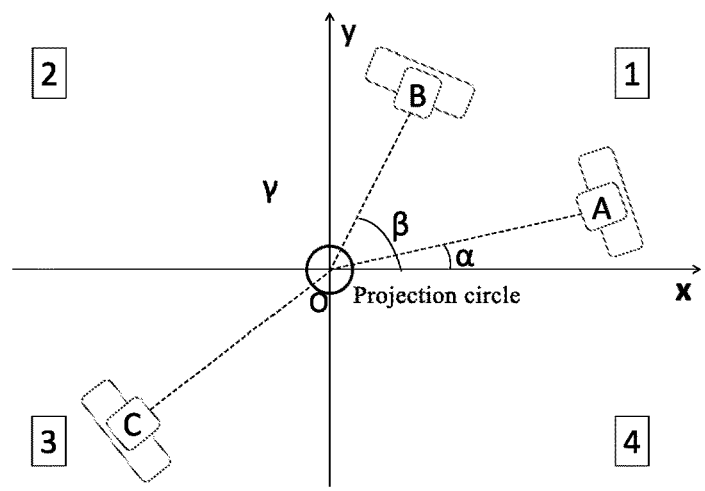
FIG. 8 is a schematic diagram of angles of three users relative to a projection circle in a panoramic image according to an embodiment of the present disclosure.

Assuming that the positions of the first user A, the second user B, and the third user C relative to the audio equipment are as shown in FIG. 7, after the analysis of the panoramic images at different moments, it is detected that there are three users around the audio equipment. As shown in FIG. 8, the projection angle of the first user A relative to the projection circle is $\alpha$, the projection angle of the second user B relative to the projection circle is $\beta$, and the projection angle of the third user C relative to the projection circle is $\gamma$, $\alpha<\beta<\gamma$. According to the projection angles of the three users relative to the projection circle and the arc length range of the projection circle corresponding to each group, it is determined that the first user A and the second user B are in the first group and in the first quadrant, and the third user C is in the second group and in the third quadrants. Since the second group and the first group are spaced apart by one group, i.e., the second group and the first group are not adjacent to each other in location, at this point, the display area is determined as full screen display.

In the present embodiment, the groups in which multiple users are located are not adjacent to each other in location, which should be understood that if there are any two groups that are not adjacent in location, the groups in which the multiple users are located are not adjacent to each other in location. Assuming that user A is in the first group, user B is in the second group, and user C is in the third group, since the first group and the third group are spaced apart by the second group in location, at this point, it is determined that users A to C are not adjacent to each other in location.

(2) Method 2

When the first user and the second user are in the first group, and the third user is in the second group, if the second group is adjacent to the first group in location with respect to the grouping direction, an included angle formed on the horizontal plane by the first connection line between a user position on the projection circle corresponding to the first user and the center position of the horizontal projection of the display screen and the second connection line between a user position on the projection circle corresponding to the third user and the center position of the horizontal projection of the display screen is acquired as the first included angle, and an arc-shaped area enclosed by arcs on upper and lower edges of the display screen corresponding to the first included angle is determined as the display area, wherein, the angle on the projection circle corresponding to the first user is smaller than the angle on the projection circle corresponding to the second user.

Figure 3:
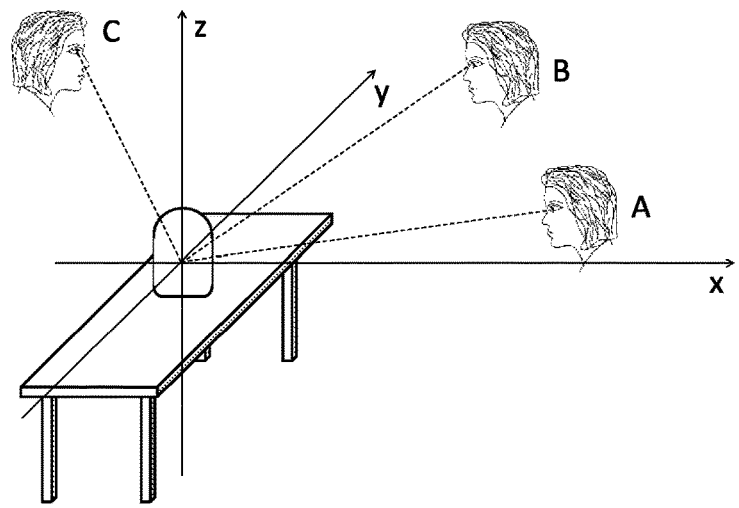
FIG. 3 is a schematic diagram showing that the groups in which three users are located are adjacent to each other according to an embodiment of the present disclosure.
Figure 5:
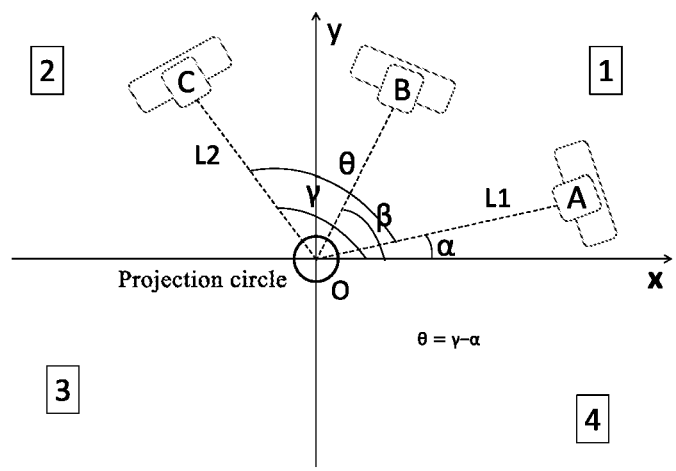
FIG. 5 is a schematic diagram of angles of three users relative to a projection circle in a panoramic image according to an embodiment of the present disclosure.
Figure 6:
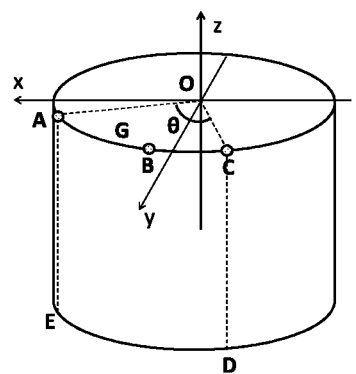
FIG. 6 is a schematic diagram of a display area according to an embodiment of the present disclosure.

Assuming that the positions of the first user A, the second user B, and the third user C relative to the audio equipment are as shown in FIG. 3, after the analysis of the panoramic images at different moments, it is detected that there are three users around the audio equipment. As shown in FIG. 5, the projection angle of the first user A relative to the projection circle is $\alpha$, the projection angle of the second user B relative to the projection circle is $\beta$, and the projection angle of the third user C relative to the projection circle is $\gamma$, $\alpha<\beta<\gamma$. According to the projection angles of the three users relative to the projection circle and the arc length range of the projection circle corresponding to each group, it is determined that the first user A and the second user B are in the first group and in the first quadrant, and the third user C is in the second group and in the second quadrant. Since the second group is adjacent to the first group in location with respect to the grouping direction, i.e., the second group is adjacent to the first group with respect to the clockwise direction, at this point, an included angle formed on the horizontal plane by the first connection line L1 between a user position A on the projection circle corresponding to the first user A and the center position O of the horizontal projection of the display screen and the second connection line L2 between a user position C on the projection circle corresponding to the third user C and the center position O of the horizontal projection of the display screen is acquired as the first included angle $\theta$, $\theta=\gamma-\alpha$. As shown in FIG. 6, the arc-shaped area enclosed by the arcs AC and ED on the upper and lower edges of the display screen corresponding to the first included angle $\theta$ and the straight lines AE and CD are determined as the display area. In other words, the arc-shaped area ACDE is the display area.

(3) Method 3

When the first user and the second user are in the first group, and the third user is in the second group, if the second group is adjacent to the first group in location with respect to an direction opposite to the grouping direction, an included angle formed on the horizontal plane by the third connection line between a user position on the projection circle corresponding to the second user and the center position of the horizontal projection of the display screen and a fourth connection line between a user position on the projection circle corresponding to the third user and the center position of the horizontal projection of the display screen is acquired as the second included angle, and an arc-shaped area enclosed by arcs on upper and lower edges of the display screen corresponding to the second included angle is determined as the display area. The angle on the projection circle corresponding to the first user is smaller than the angle on the projection circle corresponding to the second user.

Assuming that in FIG. 5, according to the angles of the three users relative to the projection circle and the arc length range of the projection circle corresponding to each group, it is determined that the first user A and the second user B are in the first group and in the first quadrant, and the third user C is in the second group and in the fourth quadrant. Since the second group is adjacent to the first group in location in the opposite direction of the grouping direction, i.e., the second group is adjacent to the first group with respect to the counterclockwise direction, at this point, an included angle formed on the horizontal plane by the third connection line between a user position B on the projection circle corresponding to the second user B and the center position O of the horizontal projection of the display screen and the fourth connection line between a user position C on the projection circle corresponding to the third user C and the center position O of the horizontal projection of the display screen is acquired as the second included angle. The arc-shaped area enclosed by the two arcs on the upper and lower edges of the display screen corresponding to the second included angle and the two straight lines between the two arcs are determined as the display area.

In the present embodiment, when multiple users are grouped, there are situations where multiple users are in the same group. In these situations, a third included angle formed on the horizontal plane by a fifth connection line between a user position corresponding to a smallest projection angle and the center position of the horizontal projection of the display screen and a sixth connection line between a user position corresponding to a largest projection angle and the center position of the horizontal projection of the display screen is acquired; and an arc-shaped area enclosed by arcs on upper and lower edges of the display screen corresponding to the third included angle is determined as the display area.

Figure 10:
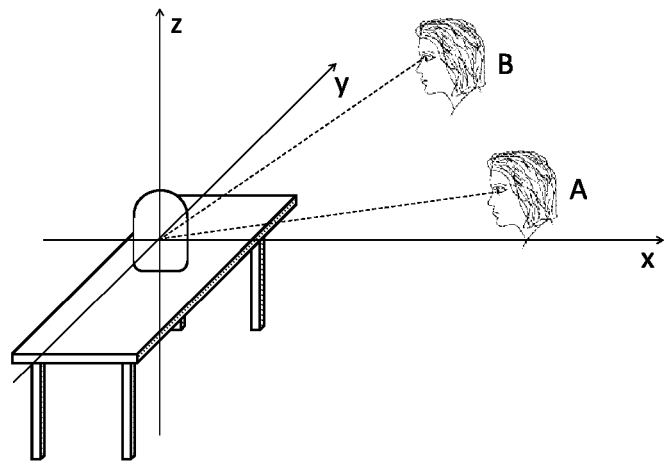
FIG. 10 is a schematic diagram showing that two users are in the same group according to an embodiment of the present disclosure.
Figure 11:
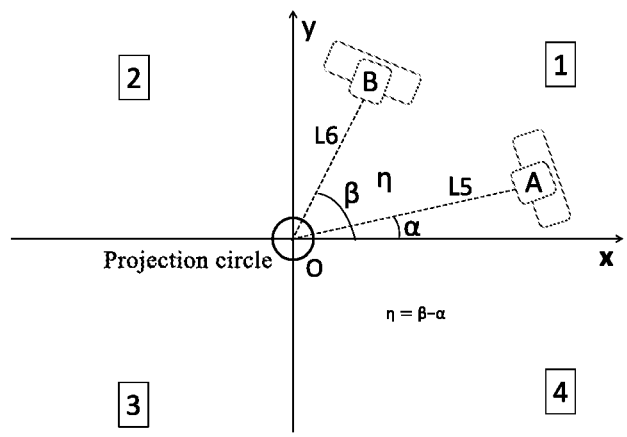
FIG. 11 is a schematic diagram of angles of two users relative to a projection circle according to an embodiment of the present disclosure.
Figure 12:
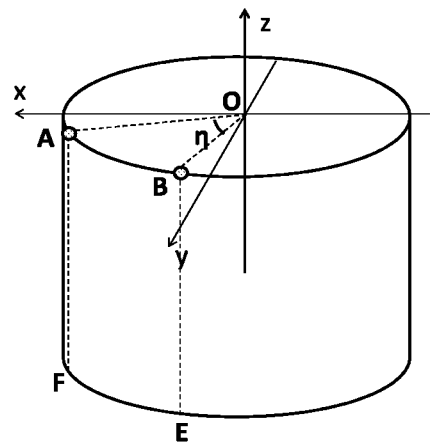
FIG. 12 is a schematic diagram of a display area according to an embodiment of the present disclosure.

In an example, assuming that multiple users include two users: a first user A and a second user B. The positions of the first user A and the second user B relative to the audio equipment are as shown in FIG. 10. After the analysis of the panoramic images at different moments, it was detected that there are two users around the audio equipment. As shown in FIG. 11, the projection angle of the first user A relative to the projection circle is $\alpha$, and the projection angle of the second user B relative to the projection circle is $\beta$, $\alpha<\beta$. According to the projection angles of the two users relative to the projection circle, and the arc length range of the projection circle corresponding to each group, it is determined that the first user A and the second user B are in the first group and in the first quadrant. Since both the detected users are in the same group, at this point, an included angle formed on the horizontal plane by the fifth connection line L5 between a user position A on the projection circle corresponding to the first user A and the center position O of the horizontal projection of the display screen and the sixth connection line L6 between a user position B on the projection circle corresponding to the second user B and the center position O of the horizontal projection of the display screen is acquired as the third included angle $\eta$, $\eta=\beta-\alpha$. As shown in FIG. 12, the arc-shaped area enclosed by the arcs AB and EF on the upper and lower edges of the display screen corresponding to the third included angle $\eta$ and the straight lines AF and BE are determined as the display area. In other words, the arc-shaped area ABEF is the display area.

Figure 9:
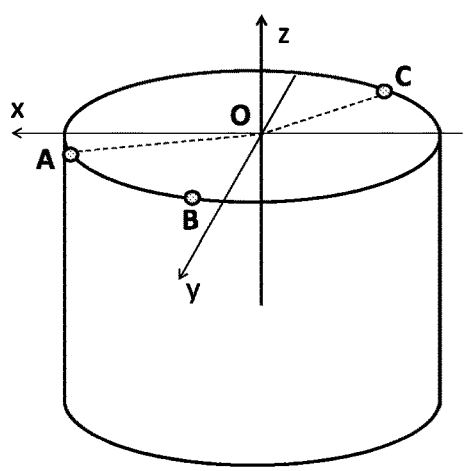
FIG. 9 is a schematic diagram of a display area according to an embodiment of the present disclosure.

After determined the display area, continue to perform step S130, namely, controlling the display area to display, which can be understood as controlling the display area to work. For example, when the display area is in full screen display, as shown in FIG. 9, the entire display screen is in a working state and perform information display and/or human-computer interaction through touch; when the display area is not in full screen display, the part of arc-shaped display area performs information display and/or human-computer interaction through touch, and other parts of the display screen is in standby or low power consumption mode.

One aspect of the present disclosure provides a directional display method of audio equipment suitable for a single-person situation.

The audio equipment of the present embodiment comprises a camera module and a display screen that is circumferentially located on sides of the audio equipment. The projection of the display screen on the horizontal plane corresponds to a circle.

Figure 13:
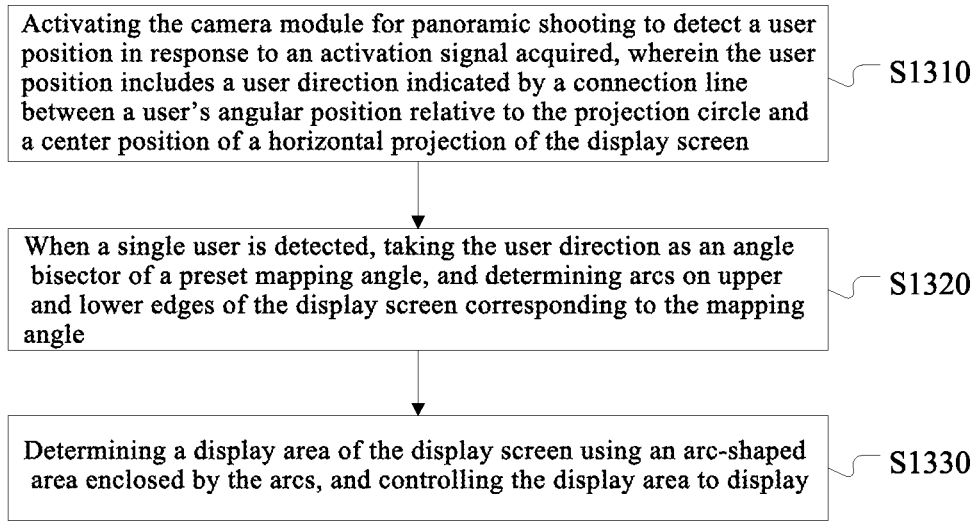
FIG. 13 is a flowchart of a directional display method of audio equipment according to an embodiment of the present disclosure.

FIG. 13 is a flowchart of a directional display method of audio equipment according to an embodiment of the present disclosure. As shown in FIG. 13, the method in the present embodiment comprises:

S1310: activating the camera module for panoramic shooting to detect a user position in response to an activation signal acquired; wherein the user position includes a user direction indicated by a connection line between a user's angular position relative to the projection circle and a center position of a horizontal projection of the display screen;

The center position of the horizontal projection of the display screen includes a center position of a projection circle formed by projecting the display screen on a first plane.

S1320: when a single user is detected, taking the user direction as an angle bisector of a preset mapping angle, and determining arcs on upper and lower edges of the display screen corresponding to the mapping angle; and S1330: determining a display area of the display screen using an arc-shaped area enclosed by the arcs, and controlling the display area to display.

The directional display method of the present embodiment detects the user position using a camera module, and when a single user is detected, the display area is determined for directional display according to the user direction and the preset mapping angle, so that the audio equipment can follow the change of the user position and adjust the visual display area in real time, thereby improving human-computer interaction effect and enhancing user experience.

Figure 14:
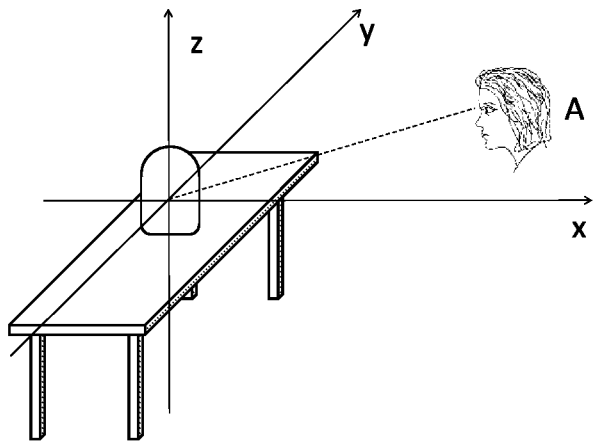
FIG. 14 is a schematic diagram of an angle of a single user relative to a projection circle according to an embodiment of the present disclosure.
Figure 15:
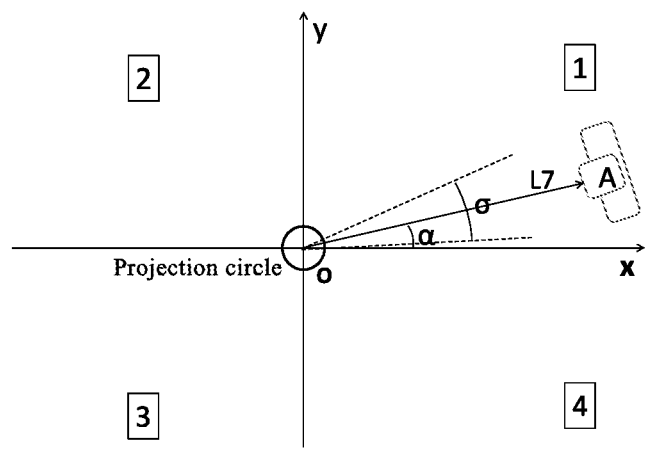
FIG. 15 is a schematic diagram of the position of a single user on the circumference of the display screen in a panoramic image according to an embodiment of the present disclosure.
Figure 16:
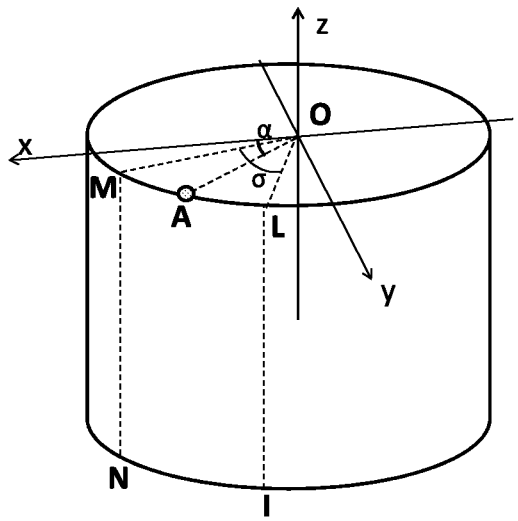
FIG. 16 is a schematic diagram of a display area according to an embodiment of the present disclosure.

As shown in FIG. 14 to FIG. 16, when it is determined that there is a single user A around the audio equipment by analyzing the panoramic images at different moments, according to the user A's position in the panoramic image and a proportional relationship between a length of the panoramic image and a perimeter of the projection circle, the projection angle of user A relative to the projection circle is determined to be a.

As shown in FIG. 15, the user direction of the user A is the user direction indicated by the connection line L7 between the angular position A of the user A relative to the projection circle and the center position O of the horizontal projection of the display screen. As shown in FIG. 16, assuming that the preset angle is σ, then on the first plane (i.e., the XOY plane), taking the connection line L7 as the angular bisector of the mapping angle σ to determine that the arcs on the upper and lower edges of the display screen corresponding to the mapping angle σ are the arcs ML and NI, respectively, then the arc-shaped area MLIN enclosed by the arcs ML and NI and the straight lines MN and LI between the two arcs is determined as the display area.

One aspect of the present disclosure provides a directional display device of audio equipment suitable for a multi-person interaction situation.

In the present embodiment, the audio equipment comprises a camera module and a display screen that is circumferentially located on sides of the audio equipment.

Figure 17:
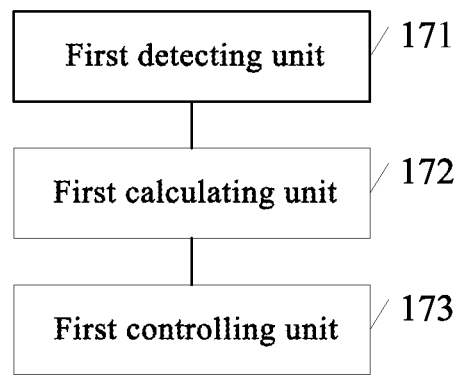
FIG. 17 is a schematic diagram of the structure of a directional display device of audio equipment according to an embodiment of the present disclosure.

FIG. 17 is a schematic diagram of the structure of a directional display device of audio equipment according to an embodiment of the present disclosure. As shown in FIG. 17, the device according to the present embodiment comprises:

a first detecting unit 171 for activating the camera module for panoramic shooting to detect a user position in response to an activation signal acquired;

a first calculating unit 172 for, when multiple users are detected, determining a display area of the display screen according to a positional relationship between the multiple users and the center position of the horizontal projection of the display screen; and a first controlling unit 173 for controlling the display area to display.

In the present embodiment, the center position of the horizontal projection of the display screen includes a center position of a projection circle formed by projecting the display screen on a first plane.

In the directional display device of the present embodiment, the first detecting unit detects the user position using a camera module; when multiple users are detected, the first calculating unit determines a display area according to a positional relationship between the multiple users and the center position of the horizontal projection of the display screen; and the first controlling unit controls this part of display area to display, to ensure that multiple users are all within the display area of the audio equipment and thus improving visual experience of the audio equipment in the case of multi-person interaction.

In an embodiment, the first detecting unit 171 is for continuously taking pictures using the camera module to obtain panoramic images; determining an target in the panoramic images as a detected user according to position changes of the target relative to an background in the panoramic images at different moments; and determining a projection angle of the user relative to the projection circle according to the user position in a panoramic image and a proportional relationship between a length of the panoramic image and a perimeter of the projection circle.

Correspondingly, the first calculating unit 172 is for grouping the multiple users according to the projection angle of the user relative to the projection circle, wherein for each group, an arc length range of angle is set corresponds to the projection circle; and determining the display area according to a quantity of groups in which the multiple users are located and a positional relationship among the groups are located.

In an embodiment, the first calculating unit 172 is for if the multiple groups in which the multiple users are located are not adjacent to each other in location, determining the display area as full screen display; if the multiple groups are located adjacent to each other in location, determining the display area according to the center position of the horizontal projection of the display screen and the projection angle of the user relative to the projection circle. Namely, sorting the multiple groups in which the multiple users are located according to a grouping direction which is an ascending order by corresponding arc lengths or angles of the groups, wherein the multiple groups in which the multiple users are located include a first group and a second group; when the second group is adjacent to the first group in location with respect to the grouping direction, acquiring a first included angle formed on the horizontal plane by a first connection line between a user position with a smallest projection angle in the first group and the center position of the horizontal projection of the display screen and a second connection line between a user position with a largest projection angle in the second group and the center position of the horizontal projection of the display screen, and determining an arc-shaped area enclosed by arcs on upper and lower edges of the display screen corresponding to the first included angle as the display area; when the second group is adjacent to the first group in location with respect to an direction opposite to the grouping direction, acquiring a second included angle formed on the horizontal plane by a third connection line between a user position with a largest projection angle in the first group and the center position of the horizontal projection of the display screen and a fourth connection line between a user position with a smallest projection angle in the second group and the center position of the horizontal projection the display screen, and determining an arc-shaped area enclosed by arcs on upper and lower edges of the display screen corresponding to the second included angle as the display area.

The first calculating unit 172 is specifically for, when the first user, the second user, and the third user are in three groups respectively, or when the first user, the second user, and the third user are in two groups but the two groups in which the three users are located are not adjacent to each other in location, determining the display area as full screen display;

when the first user and the second user are in a first group, and the third user is in a second group, if the second group is adjacent to the first group in location with respect to the grouping direction, acquiring an included angle formed on the horizontal plane by the first connection line between the user position on the projection circle corresponding to the first user and the center position of the horizontal projection of the display screen and the second connection line between the user position on the projection circle corresponding to the third user and the center position of the horizontal projection of the display screen as the first included angle, and determining an arc-shaped area enclosed by arcs on upper and lower edges of the display screen corresponding to the first included angle as the display area;

if the second group is adjacent to the first group in location with respect to an direction opposite to the grouping direction, acquiring an included angle formed on the horizontal plane by the third connection line between the user position on the projection circle corresponding to the second user and the center position of the horizontal projection of the display screen and a fourth connection line between the user position on the projection circle corresponding to the third user and the center position of the horizontal projection of the display screen as the second included angle, and determining an arc-shaped area enclosed by arcs on upper and lower edges of the display screen corresponding to the second included angle as the display area; wherein an angle on the projection circle corresponding to the first user is smaller than an angle of the projection circle corresponding to the second user.

In an embodiment, the first calculating unit 172 is for, when the multiple users are in a same group, acquiring a third included angle formed on the horizontal plane by a fifth connection line between the user position corresponding to a smallest projection angle and the center position of the horizontal projection of the display screen and a sixth connection line between the user position corresponding to a largest projection angle and the center position of the horizontal projection of the display screen; and determining an arc-shaped area enclosed by arcs on upper and lower edges of the display screen corresponding to the third included angle as the display area.

The first calculating unit 172 is specifically for, when the first user and the second user are in a same group, acquiring an included angle formed on the horizontal plane by the fifth connection line between the user position on the projection circle corresponding to the first user and the center position of the horizontal projection of the display screen and the sixth connection line between the user position on the projection circle corresponding to the second user and the center position of the horizontal projection of the display screen as the third angle; and determining an arc-shaped area enclosed by arcs on upper and lower edges of the display screen corresponding to the third included angle as the display area.

One aspect of the present disclosure provides a directional display device of audio equipment suitable for a single-person situation.

In the present embodiment, the audio equipment comprises a camera module and a display screen that is circumferentially located on sides of the audio equipment. The projection of the display screen on the horizontal plane corresponds to a circle.

Figure 18:
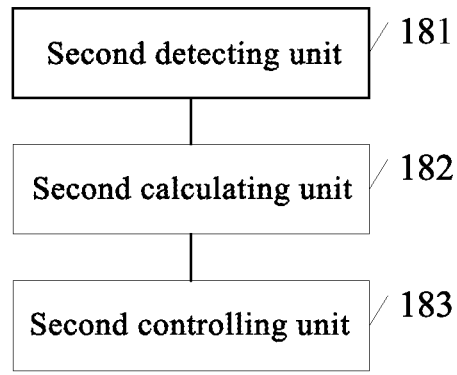
FIG. 18 is a schematic diagram of the structure of a directional display device of audio equipment according to an embodiment of the present disclosure.

FIG. 18 is a schematic diagram of the structure of a directional display device of audio equipment according to an embodiment of the present disclosure. As shown in FIG. 18, the device according to the present embodiment comprises:

a second detecting unit 181 for activating the camera module for panoramic shooting to detect a user position in response to an activation signal acquired, wherein the user position includes a user direction indicated by a connection line between a user's angular position relative to the projection circle and a center position of the horizontal projection of the display screen;

a second calculating unit 182 for, when a single user is detected, taking the user direction as an angle bisector of a preset mapping angle, and determining arcs on upper and lower edges of the display screen corresponding to the mapping angle; and a second controlling unit 183 for determining a display area of the display screen using an arc-shaped area enclosed by the arcs, and controlling the display area to display;

wherein the center position of the horizontal projection of the display screen includes a center position of a projection circle formed by projecting the display screen on a first plane.

In the directional display device of the present embodiment, the second detecting unit detects the user position using the camera module; when a single user is detected, the second calculating unit determines a display area according to the user direction and the preset mapping angle; and the second controlling unit controls the display area to display, so that the audio equipment can follow the change of the user position and adjust the visual display area in real time, thereby improving human-computer interaction effect and enhancing user experience.

The device embodiments are substantially correspond to the method embodiments, so the relevant contents may refer to the description of the corresponding parts of the method embodiments. The device embodiments described above are merely illustrative, in which the units described as separate components may or may not be physically separated, and the components illustrated as units may or may not be physical units. In other words, they may be located in one place, or distributed in multiple network units. Some or all of the modules can be selected according to actual needs to achieve the objectives of the solutions of the present embodiment. Those of ordinary skill in the art can understand and implement them without paying creative efforts.

Another aspect of the present disclosure provides an audio equipment.

Figure 19:
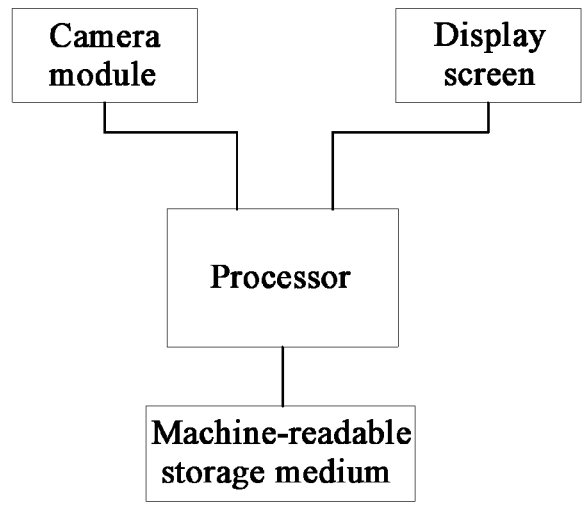
FIG. 19 is a block diagram of the structure of audio equipment according to an embodiment of the present disclosure.

FIG. 19 is a block diagram of the structure of the audio equipment according to an embodiment of the present disclosure. As shown in FIG. 19, the audio equipment comprises a camera module and a display screen that is circumferentially located on sides of the audio equipment. The audio equipment further comprises a processor and a machine-readable storage medium having machine-executable instructions stored thereon, and by reading and executing the machine-executable instructions in the machine-readable storage medium, the processor can execute the directional display method of audio equipment described above.

Another aspect of the present disclosure provides a system.

Figure 20:
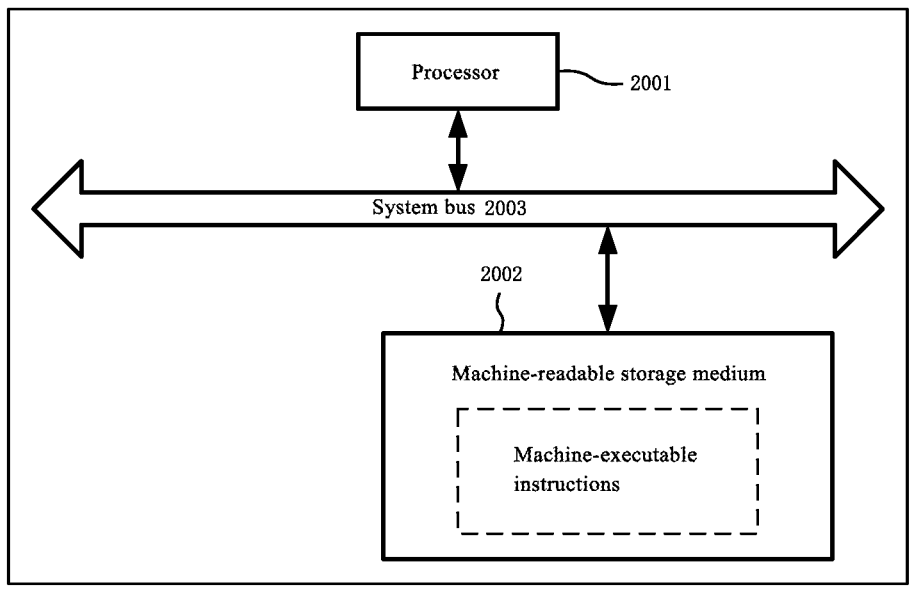
FIG. 20 is a schematic diagram of the hardware structure of a system according to an embodiment of the present disclosure.

The system provided in the present disclosure can be implemented by software, or by hardware, or by a combination of software and hardware. Take software implementation as an example, referring to FIG. 20, the system provided in the present disclosure may comprise a processor 2001 and a machine-readable storage medium 2002 having machine-executable instructions stored thereon. The processor 2001 and the machine-readable storage medium 2002 may communicate via a system bus 2003. In addition, by reading and executing the machine-executable instructions corresponding to the directional display logic of the audio equipment in the machine readable storage medium 2002, the processor 2001 can execute the directional display method of audio equipment described above.

Another aspect of the present disclosure provides a machine-readable storage medium.

The machine-readable storage medium according to the embodiment of the present disclosure has machine-executable instructions stored thereon, and when executed by a processor, the machine-executable instructions can realize the directional display method of audio equipment described above.

It should be noted that the readable storage medium according to the embodiment of the present disclosure may be, for example, any medium that can contain, store, transmit, propagate, or transmit instructions. For example, the computer-readable medium may include, but is not limited to, an electric, magnetic, optical, electromagnetic, infrared, or semiconductor system, apparatus, device, or propagation medium. Specific examples of the computer-readable medium include: a magnetic storage device, such as a magnetic tape or hard disk (HDD); an optical storage device, such as an optical disk (CD-ROM); a memory, such as a random access memory (RAM) or a flash memory; and/or a wired/wireless communication link.

The machine-readable storage medium may include a computer program, and the computer program may include code/computer-executable instructions, which, when executed by the processor, cause the processor to execute, for example, the flow process of the directional display method of audio equipment described above and any variations thereof.

The computer program may be configured to have, for example, computer program codes including computer program modules. For example, in an exemplary embodiment, the codes in the computer program may include one or more program modules. It should be noted that the division method and number of modules are not fixed. Those skilled in the art can use appropriate program modules or program module combinations according to the actual situation. These program module combinations, when executed by the processor, cause the processor to execute, for example, the flow process of the directional display method of audio equipment described above and any variations thereof.

In order to clearly describe the technical solutions of the embodiments of the present disclosure, in the embodiments of the present disclosure, terms such as "first" and "second" are used to distinguish the same or similar items having substantially the same functions and effects. A person skilled in the art can understand that the terms "first" and "second" do not limit the quantity and order of execution.

The description above is merely specific embodiments of the present disclosure. With the foregoing teachings of the present disclosure, a person skilled in the art may make other improvements or modifications based on the foregoing embodiments. A person skilled in the art should understand that the specific description above is only for better explaining the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A directional display method of audio equipment, wherein the audio equipment comprises a camera module and a display screen that is circumferentially located on sides of the audio equipment, and the method comprises:
    activating the camera module for panoramic shooting to detect a user position in response to an activation signal acquired;
    when multiple users are detected, determining a display area of the display screen according to a positional relationship between the multiple users and a center position of a horizontal projection of the display screen; and
    controlling the display area to display,
    the center position of the horizontal projection of the display screen includes a center position of a projection circle formed by projecting the display screen on a first plane, wherein activating the camera module for panoramic shooting to detect a user position comprises:
    continuously taking pictures using the camera module to obtain panoramic images;
    determining an target in the panoramic images as a detected user according to position changes of the target relative to an background in the panoramic images at different moments; and
    determining a projection angle of the user relative to the projection circle according to the user position in a panoramic image and a proportional relationship between a length of the panoramic image and a perimeter of the projection circle.

2. The method according to claim 1, wherein when multiple users are detected, determining the display area of the display screen according to a positional relationship between the multiple users and a center position of the horizontal projection of the display screen comprises:
    grouping the multiple users according to the projection angle of the user relative to the projection circle, wherein for each group, an arc length range of angle is set corresponding to the projection circle; and
    determining the display area according to a quantity of groups in which the multiple users are located and a positional relationship among the groups in which the multiple users are located.

3. The method according to claim 2, wherein determining the display area according to a quantity of groups in which the multiple users are located and a positional relationship among the groups in which the multiple users are located comprises:
    if the multiple groups in which the multiple users are located are not adjacent to each other in location, determining the display area as full screen display; if the multiple groups are located adjacent to each other in location, determining the display area according to the center position of the horizontal projection of the display screen and the projection angle of the user relative to the projection circle.

4. The method according to claim 3, wherein if the multiple groups are located adjacent to each other in location, determining the display area according to the center position of the horizontal projection of the display screen and the projection angle of the user relative to the projection circle comprises:
    sorting the multiple groups in which the multiple users are located according to a grouping direction which is an ascending order by corresponding arc lengths or angles of the groups, wherein the multiple groups in which the multiple users are located include a first group and a second group;
    when the second group is adjacent to the first group in location with respect to the grouping direction, acquiring a first included angle formed on the horizontal plane by a first connection line between a user position with a smallest projection angle in the first group and the center position of the horizontal projection of the display screen and a second connection line between a user position with a largest projection angle in the second group and the center position of the horizontal projection of the display screen, and determining an arc-shaped area enclosed by arcs on upper and lower edges of the display screen corresponding to the first included angle as the display area;

when the second group is adjacent to the first group in location with respect to an direction opposite to the grouping direction, acquiring a second included angle formed on the horizontal plane by a third connection line between a user position with a largest projection angle in the first group and the horizontal projection center position of the display screen and a fourth connection line between a user position with a smallest projection angle in the second group and the horizontal projection center position of the display screen, and determining an arc-shaped area enclosed by arcs on upper and lower edges of the display screen corresponding to the second included angle as the display area.

5. The method according to claim 4, wherein when the multiple users include a first user, a second user, and a third user, determining the display area according to a quantity of groups in which the multiple users are located and a positional relationship among the groups in which the multiple users are located comprises:

when the first user, the second user, and the third user are in three groups respectively, or when the first user, the second user, and the third user are in two groups but the two groups in which the three users are located are not adjacent to each other in location, determining the display area as full screen display;

when the first user and the second user are in a first group, and the third user is in a second group, if the second group is adjacent to the first group in location with respect to the grouping direction, acquiring an included angle formed on the horizontal plane by the first connection line between the user position on the projection circle corresponding to the first user and the center position of the horizontal projection of the display screen and the second connection line between the user position on the projection circle corresponding to the third user and the center position of the horizontal projection of the display screen as the first included angle, and determining an arc-shaped area enclosed by arcs on upper and lower edges of the display screen corresponding to the first included angle as the display area;

if the second group is adjacent to the first group in location with respect to an direction opposite to the grouping direction, acquiring an included angle formed on the horizontal plane by a third connection line between the user position on the projection circle corresponding to the second user and the center position of the horizontal projection of the display screen and a fourth connection line between the user position on the projection circle corresponding to the third user and the center position of the horizontal projection of the display screen as the second included angle, and determining an arc-shaped area enclosed by arcs on upper and lower edges of the display screen corresponding to the second included angle as the display area;

wherein an angle on the projection circle corresponding to the first user is smaller than an angle on the projection circle corresponding to the second user.

6. The method according to claim 2, wherein determining the display area according to a quantity of groups in which the multiple users are located and a positional relationship among the groups in which the multiple users are located comprises:

when the multiple users are in a same group, acquiring a third included angle formed on the horizontal plane by a fifth connection line between a user position corresponding to a smallest projection angle and the center position of the horizontal projection of the display screen and a sixth connection line between a user position corresponding to a largest projection angle and the center position of the horizontal projection of the display screen; and determining an arc-shaped area enclosed by arcs on upper and lower edges of the display screen corresponding to the third included angle as the display area.

7. The method according to claim 6, wherein when the multiple users include a first user and a second user, determining the display area according to a quantity of groups in which the multiple users are located and a positional relationship among the groups in which the multiple users are located comprises:

when the first user and the second user are in a same group, acquiring an included angle formed on the horizontal plane by the fifth connection line between a user position on the projection circle corresponding to the first user and the center position of the horizontal projection of the display screen and the sixth connection line between a user position on the projection circle corresponding to the second user and the center position of the horizontal projection of the display screen as the third angle; and determining an arc-shaped area enclosed by arcs on upper and lower edges of the display screen corresponding to the third included angle as the display area.

8. A directional display method of audio equipment, wherein the audio equipment comprises a camera module and a display screen that is circumferentially located on sides of the audio equipment, and the method comprises:

activating the camera module for panoramic shooting to detect a user position in response to an activation signal acquired, wherein the user position includes a user direction indicated by a connection line between a user's angular position relative to the projection circle and a center position of a horizontal projection of the display screen;

when a single user is detected, taking the user direction as an angle bisector of a preset mapping angle, and determining arcs on upper and lower edges of the display screen corresponding to the mapping angle; and determining a display area of the display screen using an arc-shaped area enclosed by the arcs, and controlling the display area to display;

wherein the center position of the horizontal projection of the display screen includes a center position of a projection circle formed by projecting the display screen on a firs plane.

9. Audio equipment, comprising a camera module and a display screen that is circumferentially located on sides of the audio equipment, wherein the audio equipment further comprises a processor and a non-transitory machine-readable storage medium having machine-executable instructions stored thereon, and by reading and executing the machine-executable instructions in the non-transitory machine-readable storage medium, the processor can execute a directional display method of the audio equipment comprising:

activating the camera module for panoramic shooting to detect a user position in response to an activation signal acquired, wherein the user position includes a user direction indicated by a connection line between a user's angular position relative to the projection circle and a center position of a horizontal projection of the display screen;

when a single user is detected, taking the user direction as an angle bisector of a preset mapping angle, and determining arcs on upper and lower edges of the display screen corresponding to the mapping angle; and determining a display area of the display screen using an arc-shaped area enclosed by the arcs, and controlling the display area to display;

wherein the center position of the horizontal projection of the display screen includes a center position of a projection circle formed by projecting the display screen on a first plane.

10. A non-transitory machine-readable storage medium having machine-executable instructions stored thereon, wherein when executed by a processor, to perform a directional display method of audio equipment, wherein the audio equipment comprises a camera module and a display screen that is circumferentially located on sides of the audio equipment, the directional display method of the audio equipment comprises:

activating the camera module for panoramic shooting to detect a user position in response to an activation signal acquired, wherein the user position includes a user direction indicated by a connection line between a user's angular position relative to the projection circle and a center position of a horizontal projection of the display screen;

when a single user is detected, taking the user direction as an angle bisector of a preset mapping angle, and determining arcs on upper and lower edges of the display screen corresponding to the mapping angle; and determining a display area of the display screen using an arc-shaped area enclosed by the arcs, and controlling the display area to display;

wherein the center position of the horizontal projection of the display screen includes a center position of a projection circle formed by projecting the display screen on a first plane.

* * * * *